United States Patent [19]

Ikeda et al.

[11] Patent Number: 4,604,333
[45] Date of Patent: Aug. 5, 1986

[54] NON-AQUEOUS ELECTROLYTE BATTERY WITH SPIRAL WOUND ELECTRODES

[75] Inventors: Hironosuke Ikeda, Hirakata; Etsuro Yamashita, Akashi; Hitoshi Nakashima, Kobe, all of Japan

[73] Assignee: Sanyo Electric Co., Ltd., Japan

[21] Appl. No.: 750,855

[22] Filed: Jul. 1, 1985

Related U.S. Application Data

[63] Continuation of Ser. No. 596,507, Apr. 3, 1984, abandoned.

[30] Foreign Application Priority Data

Apr. 6, 1983 [JP]  Japan ................................. 58-51900

[51] Int. Cl.⁴ ............................................. H01M 4/00
[52] U.S. Cl. ...................................... 429/94; 429/136; 429/144; 429/194
[58] Field of Search ................. 429/94, 194, 196, 136, 429/144

[56] References Cited

U.S. PATENT DOCUMENTS

| | | |
|---|---|---|
| 3,298,871 | 1/1967 | Binder et al. ........................... 429/94 |
| 3,410,726 | 11/1968 | Harivel .............................. 429/94 X |
| 3,450,566 | 6/1969 | Solomon et al. ............... 429/136 X |
| 3,542,601 | 11/1970 | Gabano ................................ 429/136 |
| 4,184,012 | 1/1980 | Barrella .................................. 429/94 |
| 4,378,414 | 3/1983 | Furukawa et al. .................. 429/144 |
| 4,385,101 | 5/1983 | Catanzarite ........................... 429/94 |
| 4,444,854 | 4/1984 | Hooke .................................... 429/94 |

Primary Examiner—Charles F. LeFevour
Attorney, Agent, or Firm—Darby & Darby

[57] ABSTRACT

A non-aqueous electrolyte battery comprising a spiral electrode body provided by winding a band-shaped negative electrode plate of a light metal and a band-shaped positive electrode plates through a separator, an arbitrary portion where said positive and negative electrode plates are faced each other being isolated by interposition of a heat resisting insulating member which is made of a material different from said separator.

7 Claims, 9 Drawing Figures

NON-AQUEOUS ELECTROLYTE BATTERY WITH SPIRAL WOUND ELECTRODES

This is a continuation of application Ser. No. 596,507 filed Apr. 3, 1984, abandoned.

BACKGROUND OF THE INVENTION (1) Field of the Invention

This invention relates to a non-aqueous electrolyte battery including a spiral electrode body which is provided by winding both a band-shaped negative electrode, using a light metal such as lithium, sodium, etc as an active material, and a band-shaped positive electrode, using manganese dioxide, carbon fluoride, etc as an active material, through a separator.

(2) Description of the Prior Art

Batteries of this kinds provided with the spiral electrode body have an advantage of taking high current discharge therefrom as compared with button type or flat type batteries. However, since a separator interposed between positive and negative electrodes is generally composed of materials with comparatively low melting point such as non-woven fabrics or sheets of non-aqueous electrolyte resisting polypropylene (m.p: 165° to 170° C.) or polyethylene (m.p: 130° to 140° C.), it may be melted by generation of heat within the battery caused by high current discharge or external short-circuiting, so that internal short-circuiting may bring about.

In U.S. Pat. No. 3,298,871, there has been disclosed a battery structure with a spiral electrode body, taking a nickel-cadmium battery as an example, which is prevented from short-circuiting, caused by piercing of separators by rough edges or burrs in the spirally wound cell roll or cracking of electrodes at both end edges when manufactured, by covering the both end edges of band-shaped electrodes with a sheet of regenerated cellulose or the like. However, the sheet is not employed in order to prevent the short-circuiting which might be caused by melt or fusion of separators. Particularly, since the regenerated cellulose concretely disclosed is carbonized by heat and becomes conductive, the short-circuiting caused by melt of separators can not be prevented.

SUMMARY OF THE INVENTION

The present invention provides a non-aqueous electrolyte battery which includes a spiral electrode body constituted by winding a band-shaped negative electrode plate of a light metal and a band-shaped positive electrode plate through a separator, an arbitrary portion where said positive and negative electrode plates are faced each other being isolated by interposition of a heat resisting insulating member which is made of a material different from the separator.

According to the present invention, even if the separator is melted by internal heat of the battery caused by the high current discharge or external short circuiting of the battery, the internal short-circuiting of the battery can be prevented since the heat resisting insulating member is remained between positive and negative electrode plates.

DETAILED DESCRIPTION OF THE PREFERRED EMBODIMENTS

Figure 1:
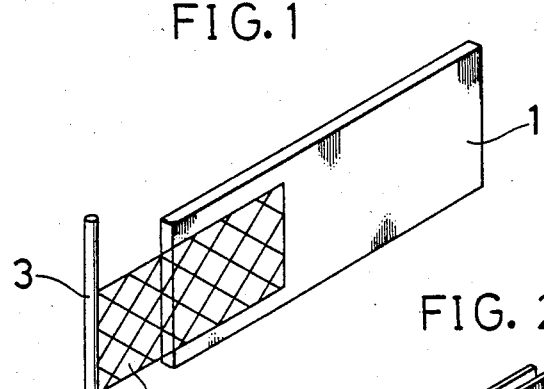
FIGS. 1 to 4 are decomposed perspective views of components of a spiral electrode body used for one embodiment of a battery according to the present invention, and show a negative electrode, a separator, a heat resisting insulating member, and a positive electrode, respectively.
Figure 2:
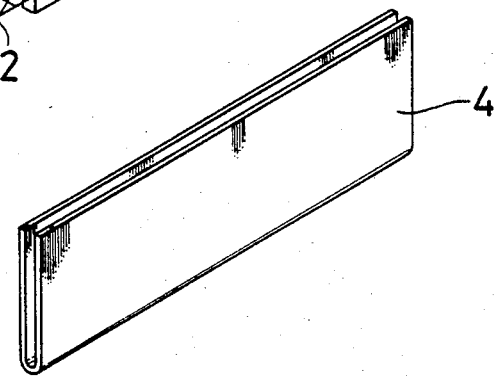
Figure 3:
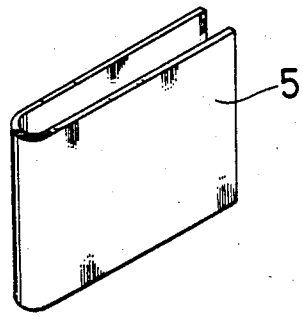
Figure 4:
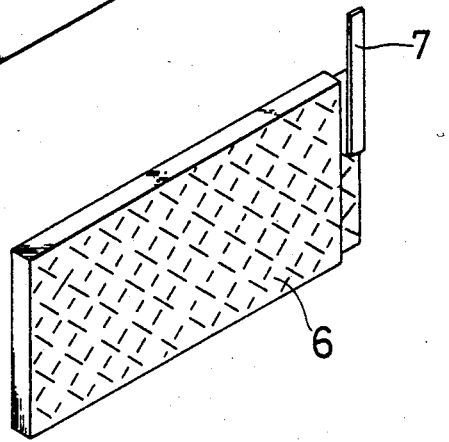
Figure 5:
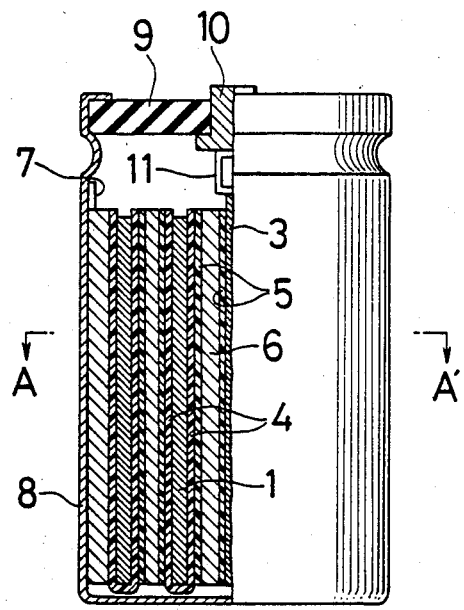
FIG. 5 is a part of a sectional view of a battery according to one embodiment of the present invention.
Figure 6:
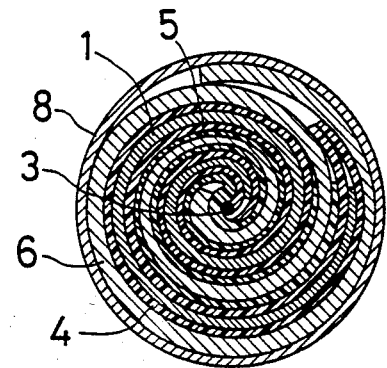
FIG. 6 is a sectional view along line A-A' of FIG. 5.

As the heat resisting member used in the present invention, sheets or molded members of high melting point resins given by fluorine-contained resins such as polytetrafluoroethylene (melting point: 327° C.), etc, silicone resins (melting point: above 200° C.), and the like may be employed.

In the battery according to the present invention, an arbitrary portion where the positive and negative electrode plates are faced each other is isolated by interposition of a heat resisting insulating member which is made of a material different from the separator. The portion may be at the whole part between the positive electrode plate and the negative electrode plate but is suitable at a position of these electrode plates where a temperature is most raised. Concretely, there is given a starting portion of roll which corresponds to a center of a spiral electrode body which is difficult to dissipate the heat, and/or a portion near a lead of an electrode which has a high current density.

The insulating member may be used in the form of a sheet, a U-shaped sheet obtained by folding a sheet, or a column having a groove in the side surface. More specifically, it may be employed by binding the sheet member to a separator by use of an adhesive agent, covering either the positive electrode plate or the negative electrode plate with the U-shaped sheet member, or covering the electrode plate having a separator on both surfaces with the U-shaped sheet member. Further, a heat resisting insulating member composed of a column-shaped molded body having a groove in the side surface may also be used. This may be employed by placing a starting portion of roll, which includes an overlapped portion of an electrode and a separator, in the groove.

The present invention will now be described by an embodiment of following non-aqueous electrolyte battery.

In FIGS. 1 to 6, (1) is a band-shaped negative electrode plate composed of lithium rolled plate. A negative collector net (2) is pressed on one side surface of the negative electrode plate (1) and a negative collector rod (3) serving also as a winding mandrel is fixed to an exposed end portion of the negative collector net. (4) is a separator or porous polypropylene sheet which is folded double and covers the lithium negative electrode plate (1).

(5) is a heat resisting insulating member composed of a U-shaped sheet of polytetrafluoroethylene and is provided on the separator (4) so as to be arranged at the outside of the separator (4) surrounding the negative electrode plate.

(6) is a band-shaped positive electrode plate composed of a positive materials containing manganese dioxide as an active material (manganese dioxide:graphite of conductive material:polytetrafluoroethylene of binder=85:10:5 by weight parts). A core of the electrode plate is exposed at its end portion and a positive lead (7) is fixed to the exposed portion.

And, the positive electrode plate (6) is disposed at one side surface of the heat resisting insulating member (5), and these are wound or rolled by using the negative collector rod (3) as a winding core, thereby providing a spiral electrode body.

The spiral electrode body is then placed in a casing (8) serving as a positive terminal. The positive lead (7) is spot welded to the inner surface of the casing (8), and a negative terminal (10) secured to a central perforation of an insulating sealing plate (9) is electrically connected to the negative collector rod (3) through a negative lead (11). Thereafter, the aperture edge of the casing (8) is clamped to the insulation sealing plate (9) to obtain a completed battery shown in FIG. 5.

As an electrolyte, for example, a solution prepared by dissolving 1 mol concentration of lithium perchlorate in a mixed solvent of propylene carbonate and dimethoxyethane with equal volumes is used.

Figure 7:
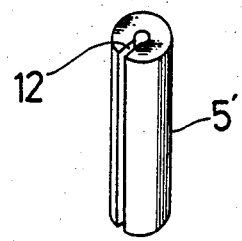
FIG. 7 is a perspective view of a heat resisting insulating member according to another embodiment used for a battery of the present invention.

FIG. 7 shows a column-shaped heat resisting insulating member (5') made of polytetrafluoroethylene according to another embodiment. The member (5') is employed by placing a starting portion of roll, which includes an overlapped portion of the electrode and separator, in the groove (12).

Figure 8:
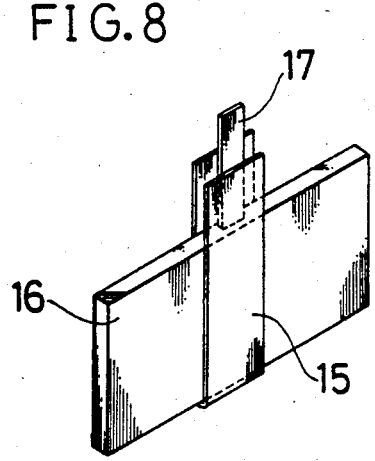
FIGS. 8 and 9 are perspective views of positive electrodes which are provided with a heat resisting insulating member on the side surface in further embodiment of a battery of the present invention.
Figure 9:
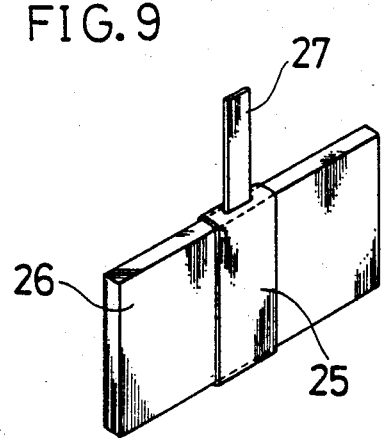

FIGS. 8 and 9 show further embodiments wherein each of positive leads (17) and (27) is provided at a center of each of positive electrode plates (16) and (26). A heat resisting insulating member shown in FIG. 8 is a twice-folded sheet-shaped heat resisting insulating member (15), which is an example covering the neighborhood of the positive lead (17). A heat resisting insulating member shown in FIG. 9 is an example wherein the positive lead (27) penetrates through the folded portion of the twice-folded sheet-shaped heat resisting insulating member (25) to cover the neighbourhood of the lead (27) therewith.

As has been described above, since the arbitrary portion where the positive and negative electrode plates are faced each other is isolated by interposition of the heat resisting insulating member, the internal short-circuiting of the battery can be prevented because the insulating member is remained between positive and negative electrode plates even if the separator is melted by the internal heat of the battery caused by high current discharge or external short-circuiting of the battery. Although the portion may correspond to the entire surface of the electrode plates, the object will be sufficiently achieved if such portion is the starting portion of roll of the electrode body at which the temperature is easily raised, and/or is a neighbourfood of the lead of the electrode which has high current density as shown in the embodiments.

What is claimed is:

1. A non-aqueous electrolyte battery comprising:

a negative electrode of a light metal having an elongated shape elongated in a first direction, said negative electrode having first and second opposed surfaces;

an elongated separator having first and second opposed surfaces, said first separator surface being disposed on one of said electrode surfaces;

a positive electrode of elongated shape having first and second opposed surfaces, one of said positive electrode surfaces being disposed against said separator second surface;

a positive lead extending over at least one of said surfaces of said positive electrode, and being electrically coupled thereto;

a negative lead being disposed over at least one of said negative electrode surfaces and being electrically coupled thereto;

first heat resistant insulating member of a material different from said separator disposed over said negative electrode on said second surface opposite substantially only said negative lead and over substantially only said negative lead; and second heat resistant insulating member of a material different from said separator disposed substantially only over said positive electrode on said second surface opposite substantially only said positive lead and over said positive lead;

wherein said positive and negative electrodes, separator, leads, and first and second heat insulating members form an electrode body, said electrode body being spirally wound upon itself, such that said negative and positive leads are disposed opposite said positive and negative electrodes respectively.

2. The non-aqueous electrolyte battery according to claim 1 wherein said positive and negative electrode plates have starting ends, said spiral electrode body having a starting portion comprised of said starting ends, at which said electrode plates winding starts, and wherein both surfaces of the starting portion are covered with a second heat resisting insulating member of a material different from said separator.

3. The non-aqueous electrolyte battery according to claim 1 wherein said first heat insulating member is comprised of two sheets.

4. The non-aqueous electrolyte battery according to claim 1 wherein said first heat insulating member is a folded sheet having a U-shape.

5. The non-aqueous electrolyte battery according to claim 2 wherein said second heat insulating member is comprised of two sheets.

6. The non-aqueous electrolyte battery according to claim 2 wherein said second heat insulating member is a folded sheet having a U-shape.

7. The non-aqueous electrolyte battery according to claim 2 wherein said second heat insulating member has a columnar shape having a side surface and including a groove therein, said starting portion of said winding being disposed within said groove such that said separator and electrodes starting portion are disposed in said groove.

* * * * *